(12) United States Patent
Sachdev et al.

(10) Patent No.: US 7,823,763 B2
(45) Date of Patent: Nov. 2, 2010

(54) FRICTION WELDING METHOD AND PRODUCTS MADE USING THE SAME

(75) Inventors: Anil K. Sachdev, Rochester Hills, MI (US); Michael D. Hanna, West Bloomfield, MI (US); Richard M. Kleber, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 89 days.

(21) Appl. No.: 11/832,356

(22) Filed: Aug. 1, 2007

(65) Prior Publication Data

US 2009/0032569 A1 Feb. 5, 2009

(51) Int. Cl.
*B23K 20/12* (2006.01)
*F16D 65/12* (2006.01)

(52) U.S. Cl. ............. 228/112.1; 228/114.5; 188/218 R; 188/218 XL

(58) Field of Classification Search .............. 228/112; 188/218, 381; 416/96
See application file for complete search history.

(56) References Cited

U.S. PATENT DOCUMENTS

| | | | |
|---|---|---|---|
| 1,989,211 A | 1/1935 | Norton | |
| 2,603,316 A | 7/1952 | Pierce | |
| 3,085,391 A | 4/1963 | Hatfield et al. | |
| 3,147,828 A | 9/1964 | Hunsaker | |
| 3,292,746 A | 12/1966 | Robinette | |
| 3,378,115 A | 4/1968 | Stephens, III | |
| 3,425,523 A | 2/1969 | Robinette | |
| 3,509,973 A | 5/1970 | Kimata | |
| 3,575,270 A | 4/1971 | Wagenfuhrer et al. | |
| 3,774,472 A | 11/1973 | Mitchell | |
| 3,841,448 A | 10/1974 | Norton, Jr. | |
| 3,975,894 A | 8/1976 | Suzuki | |
| 4,049,085 A | 9/1977 | Blunier | |
| 4,072,219 A | 2/1978 | Hahm et al. | |
| 4,106,172 A * | 8/1978 | Bache | 29/894.322 |
| 4,250,950 A | 2/1981 | Buxmann et al. | |
| 4,379,501 A | 4/1983 | Hagiwara et al. | |
| 4,475,634 A | 10/1984 | Flaim et al. | |
| 4,523,666 A | 6/1985 | Murray | |
| 4,905,299 A | 2/1990 | Ferraiuolo et al. | |
| 5,004,078 A | 4/1991 | Oono et al. | |

(Continued)

FOREIGN PATENT DOCUMENTS

CN 2005/10113784.X 10/2005

(Continued)

OTHER PUBLICATIONS

Translation of JP-2002-174281.*

(Continued)

*Primary Examiner*—Kiley Stoner
(74) *Attorney, Agent, or Firm*—Reising Ethington P.C.

(57) ABSTRACT

A method including providing a first portion including one of an annular portion or a hub portion; rotating a second portion including the other of the hub portion or the annular portion; and pressing the second portion against the first portion such that friction between the hub portion and the annular portion causes a weld joint to be created; and wherein the annular portion may or may not include a frictional damping means, which may include an insert.

24 Claims, 6 Drawing Sheets

U.S. PATENT DOCUMENTS

| | | | |
|---|---|---|---|
| 5,025,547 | A | 6/1991 | Sheu et al. |
| 5,083,643 | A | 1/1992 | Hummel et al. |
| 5,115,891 | A | 5/1992 | Raitzer et al. |
| 5,139,117 | A | 8/1992 | Melinat |
| 5,143,184 | A | 9/1992 | Snyder et al. |
| 5,183,632 | A | 2/1993 | Kiuchi et al. |
| 5,259,486 | A | 11/1993 | Deane |
| 5,310,025 | A | 5/1994 | Anderson |
| 5,416,962 | A | 5/1995 | Passarella |
| 5,417,313 | A | 5/1995 | Matsuzaki et al. |
| 5,509,510 | A | 4/1996 | Ihm |
| 5,530,213 | A | 6/1996 | Hartsock et al. |
| 5,582,231 | A | 12/1996 | Siak et al. |
| 5,620,042 | A | 4/1997 | Ihm |
| 5,660,251 | A | 8/1997 | Nishizawa et al. |
| 5,789,066 | A | 8/1998 | DeMare et al. |
| 5,819,882 | A | 10/1998 | Reynolds et al. |
| 5,855,257 | A | 1/1999 | Wickert et al. |
| 5,862,892 | A | 1/1999 | Conley |
| 5,878,843 | A | 3/1999 | Saum |
| 5,927,447 | A | 7/1999 | Dickerson |
| 6,047,794 | A | 4/2000 | Nishizawa |
| 6,073,735 | A | 6/2000 | Botsch et al. |
| 6,193,419 | B1 * | 2/2001 | Krude et al. ............. 384/544 |
| 6,206,150 | B1 | 3/2001 | Hill |
| 6,216,827 | B1 | 4/2001 | Ichiba et al. |
| 6,223,866 | B1 | 5/2001 | Giacomazza |
| 6,241,055 | B1 | 6/2001 | Daudi |
| 6,241,056 | B1 | 6/2001 | Cullen et al. |
| 6,283,258 | B1 | 9/2001 | Chen et al. |
| 6,302,246 | B1 | 10/2001 | Naumann et al. |
| 6,357,557 | B1 | 3/2002 | DiPonio |
| 6,405,839 | B1 | 6/2002 | Ballinger et al. |
| 6,465,110 | B1 | 10/2002 | Boss et al. |
| 6,481,545 | B1 | 11/2002 | Yano et al. |
| 6,505,716 | B1 | 1/2003 | Daudi et al. |
| 6,507,716 | B2 | 1/2003 | Nomura et al. |
| 6,543,518 | B1 | 4/2003 | Bend et al. |
| 6,799,664 | B1 | 10/2004 | Connolly |
| 6,880,681 | B2 | 4/2005 | Koizumi et al. |
| 6,890,218 | B2 | 5/2005 | Patwardhan et al. |
| 6,899,158 | B2 | 5/2005 | Matuura et al. |
| 6,932,917 | B2 | 8/2005 | Golden et al. |
| 7,066,235 | B2 | 6/2006 | Huang |
| 2002/0084156 | A1 | 7/2002 | Ballinger et al. |
| 2002/0104721 | A1 | 8/2002 | Schaus et al. |
| 2003/0037999 | A1 | 2/2003 | Tanaka et al. |
| 2003/0127297 | A1 | 7/2003 | Smith et al. |
| 2003/0141154 | A1 | 7/2003 | Rancourt et al. |
| 2003/0213658 | A1 | 11/2003 | Baba |
| 2004/0031581 | A1 | 2/2004 | Herreid et al. |
| 2004/0045692 | A1 | 3/2004 | Redemske |
| 2004/0074712 | A1 | 4/2004 | Quaglia et al. |
| 2004/0084260 | A1 * | 5/2004 | Hoyte et al. ............ 188/218 XL |
| 2004/0242363 | A1 | 12/2004 | Kohno et al. |
| 2005/0011628 | A1 | 1/2005 | Frait et al. |
| 2005/0121278 | A1 * | 6/2005 | Arhab et al. ............. 192/3.29 |
| 2005/0150222 | A1 | 7/2005 | Kalish et al. |
| 2005/0183909 | A1 | 8/2005 | Rau, III et al. |
| 2005/0193976 | A1 | 9/2005 | Suzuki et al. |
| 2006/0076200 | A1 * | 4/2006 | Dessouki et al. ....... 188/218 XL |
| 2006/0243547 | A1 | 11/2006 | Keller |
| 2007/0062768 | A1 * | 3/2007 | Hanna et al. ........... 188/218 XL |
| 2007/0142149 | A1 | 6/2007 | Kleber |
| 2008/0099289 | A1 * | 5/2008 | Hanna et al. ........... 188/218 XL |
| 2009/0032569 | A1 * | 2/2009 | Sachdev et al. ............... 228/2.3 |

FOREIGN PATENT DOCUMENTS

| | | | |
|---|---|---|---|
| DE | | 24 46 938 | 4/1976 |
| DE | | 25 37 038 | 3/1977 |
| DE | | 199 48 009 | 3/2001 |
| DE | | 101 41 698 | 3/2003 |
| DE | | 102005048258.9 | 10/2005 |
| EP | | 0 205 713 | 12/1986 |
| GB | | 1230 274 | 4/1971 |
| GB | | 2328952 | 3/1999 |
| JP | | 57154533 | 9/1982 |
| JP | | 2002-174281 | * 6/2002 |
| WO | | WO 98/23877 | 6/1998 |
| WO | | WO 01/36836 | 5/2001 |

OTHER PUBLICATIONS

International Search Report dated Apr. 2, 2007 for International Application No. PCT US06/29687, Publication No. WO 2007/040768; GM Global Technology Operations, Inc.

Omar Dessouki, George Drake, Brent Lowe, Wen Kuei Chang, General motors Corp: Disc Brake Squeal: Diagnosis & Prevention. 03NVC-224; Society of Automotive Engineer, Inc. 2002.

Z. Wu, C. Richter, L. Menon, A Study of Anodization Process During Pore Formation in Nanoporous Alumina Templates, Journal of the Electrochemical Society, vol. 154, 2007.

W.-J. Lee, M. Alhoshan, W.H. Smyrl, Titanium Dioxide Nanotube Arrays Fabricated by Anodizing Processes, Journal of the Electrochemical Society, vol. 153, 2006, pp. B499-505.

I.V. Sieber, P. Schmuki, Porous Tantalum Oxide Prepared by Electrochemical Anodic Oxidation, Journal of the Electrochemical Society, vol. 152, 2005, pp. C639-C644.

H. Tanaka, A. Shimada, A. Kinoshita, In situ Measurement of the Diameter of Nanopores in Silicon During Anodization in Hydrofluoric Acid Solution, Journal of the Electrochemic.

L.G. Hector, Jr., S. Sheu, Focused Energy Beam Work Roll Surface Texturing Science and Technology, Journal of Materials Processing & Manufacturing Science, vol. 2, Jul. 1993.

P.N. Anyalebechi, Ungrooved Mold Surface Topography Effects on Cast Subsurface Microstructure, Materials Processing Fundamentals, TMS 2007, pp. 49-62.

F. Yigit, Critical Wavelengths for Gap Nucleation in Solidification—Part 1: Theoretical Methodology, Journal of Applied Mechanics, vol. 67, Mar. 2000, pp. 66-76.

P.N. Anyalebechi, Undulatory Solid Shell Growth of Aluminum Alloy 3003 as a Function of the Wavelength of a Grooved Mold Surface Topography, TMS 2007, pp. 31-47.

Dessouki et al., U.S. Appl. No. 10/961,813, Coulumb friction damped disc brake rotors, Oct. 8, 2004.

Hanna et al., U.S. Appl. No. 11/475,756, Bi-metal disc brake rotor and method of manufacturing, Jun. 27, 2006.

Schroth et al., U.S. Appl. No. 11/475,759, Method of casting components with inserts for noise reduction, Jun. 27, 2006.

Schroth et al., U.S. Appl. No. 12/025,967, Damped products and methods of making and using the same, Feb. 5, 2008.

Hanna et al., U.S. Appl. No. 11/440,916, Bi-metal disc brake rotor and method of manufacture, May 25, 2006.

Hanna et al., U.S. Appl. No. 11/554,234, Coulomb damped disc brake rotor and method of manufacturing, Oct. 30, 2006.

Walker et al., U.S. Appl. No. 11/926,798, Inserts with holes for damped products and methods of making and using the same, Oct. 29, 2007.

Hanna et al., U.S. Appl. No. 11/832,401, Damped product with insert and method of making the same, Aug. 1, 2007.

Kleber, et al., U.S. Appl. No. 11/848,732, Cast-in-place torsion joint, Aug. 31, 2007.

Hanna et al., U.S. Appl. No. 11/780,679, Method of manufacturing a damped part, Jul. 20, 2007.

Aase et al., U.S. Appl. No. 11/969,259, Method of forming casting with frictional damping insert, Jan. 4, 2008.

Hanna et al., U.S. Appl. No. 12/165,729, Method for securing an insert in the manufacture of a damped part, Jul. 1, 2008.

Hanna et al., U.S. Appl. No. 12/165,731, Product with metallic foam and method of manufacturing the same, Jul. 1, 2008.

Agarwal et al., U.S. Appl. No. 11/860,049, Insert with tabs and damped products and methods of making the same, Sep. 24, 2007.

Hanna et al., U.S. Appl. No. 12/174,163, Damped part, Jul. 16, 2008.

Hanna et al., U.S. Appl. No. 12/174,223, Method of casting damped part with insert, Jul. 16, 2008.

Hanna et al., U.S. Appl. No. 12/183,180, Casting noise-damped, vented brake rotors with embedded inserts, Jul. 31, 2008.

Hanna et al., U.S. Appl. No. 12/183,104, Low mass multi-piece sound damped article, Jul. 31, 2008.

Golden et al., U.S. Appl. No. 12/105,411, Insert with filler to dampen vibrating components, Apr. 18, 2008.

Hanna et al., U.S. Appl. No. 11/440,893, Rotor assembly and method, May 25, 2006.

Carter, U.S. Appl. No. 11/680,179, Damped automotive components with cast in place inserts and method of making same, Feb. 28, 2007.

Ulicny et al., U.S. Appl. No. 12/105,438, Filler material to dampen vibrating components, Apr. 18, 2008.

Hanna et al., U.S. Appl. No. 12/272,164, Surface configurations for damping inserts, Nov. 17, 2008.

Hanna et al., U.S. Appl. No. 12/145,169, Damped product with an insert having a layer including graphite thereon and methods of making and using the same, Jun. 24, 2008.

Lowe et al., U.S. Appl. No. 12/174,320, Damped part with insert, Jul. 16, 2008.

Xia, U.S. Appl. No. 12/858,596, Lightweight brake rotor and components with composite materials, Sep. 20, 2007.

Dessouki et al., U.S. Appl. No. 12/178,872, Friction damped brake drum, Jul. 24, 2008.

* cited by examiner

FRICTION WELDING METHOD AND PRODUCTS MADE USING THE SAME

TECHNICAL FIELD

The field to which the disclosure generally relates includes a friction welding method and products made using the same.

BACKGROUND

A variety of products such as rotors, pulleys, brake drums, transmission gears, manufacturing equipment, and other products may be made of strong materials to support heavy loads and to resist wear. For example, cast iron and steel are relatively heavy materials and parts composed of such materials are therefore relatively heavy.

SUMMARY OF EXEMPLARY EMBODIMENTS OF THE INVENTION

One embodiment includes providing a first portion including one of an annular portion or a hub portion; rotating a second portion including the other of the hub portion or the annular portion; and pressing the second portion against the first portion such that friction between the hub portion and the annular portion causes a weld joint to be created.

In another embodiment the annular portion is composed of a first material, the hub portion is composed of a second material, and the second material is lighter by volume than the first material.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
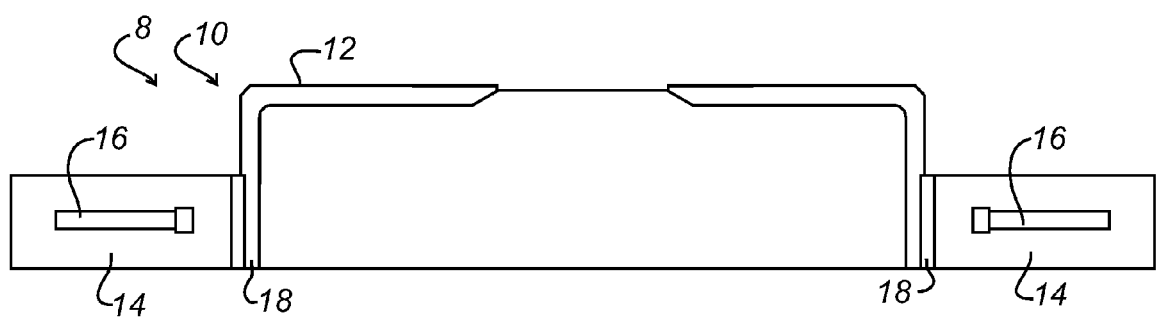
FIG. 1 illustrates a product according to one embodiment of the invention.

Referring to FIG. 1, a product or part 8 is provided according to one embodiment of the invention. The product 8 may be a rotor assembly 10. The rotor assembly 10 may include a hub portion 12 and an annular portion (rotor cheek) 14. The hub portion 12 may have a central mounting face for mounting the rotor on an associated drive member. The annular portion 14 may include at least a pair of opposite, flat annular faces adapted to interface with associated friction members, such as brake pads.

In one embodiment, the annular portion 14 may include a frictional damping means, as described hereafter, which may include an insert 16 for damping. The rotor assembly 10 may include a friction welded region 18 at the interface of the hub portion 12 and the annular portion 14. The friction welded region 18 may be formed during friction welding of the hub portion 12 to the annular portion 14.

In one embodiment, the friction welded region 18 includes an interface material. The interface material may increase the bond strength of the friction weld, improve corrosion resistance of the friction welded region, or provide an improved noise barrier for lower noise, vibration, and harshness (NVH). The interface material may include at least one of a silver electroplating, a thin foil of copper, other material that will reduce intermetallics that form during welding, or other material that provides a reinforcement. The interface may be applied as a solid sheet, paste, gel, or solution. Before welding, the interface material may be in contact with either the hub portion 12 or the annular portion 14 or both, in the form of an interface layer. Then during welding, the interface material will become welded and incorporate into the friction welding region.

In an alternative embodiment (not shown), the rotor assembly 10 may be vented in a manner known to those skilled in the art. The vented rotor assembly 10 may be constructed such that the annular portion 14 may include a first rotor cheek including a first face, a second rotor cheek including a second face and a plurality of vanes separating the first rotor cheek and the second rotor cheek. The annular portion 14 comprises a first material. The hub portion 12 comprises a second material. The second material may be lighter by volume than the first material. For example, the first material may be one of cast iron, gray cast iron, or steel, and the second material may be one of aluminum, aluminum metal matrix composites, titanium, magnesium, plastic, or composite material.

Figure 2:
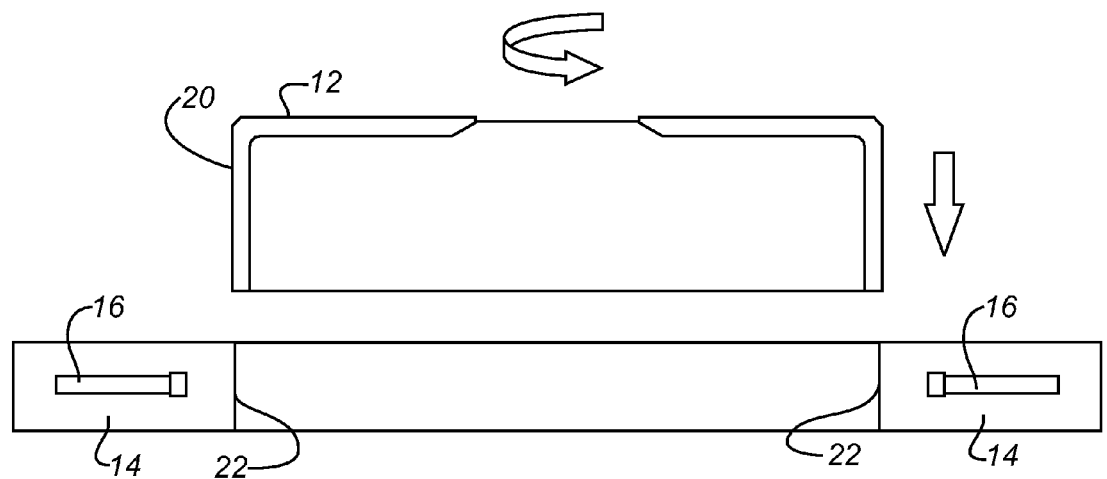
FIG. 2 illustrates a method according to one embodiment of the invention.

Referring to FIG. 2, a method is provided according to one embodiment of the invention for friction welding. Friction welding may be used to join different materials, for example cast iron and aluminum. Heat is generated through mechanical friction to weld two pieces together. According to one embodiment, the annular portion 14 is held stationary, while the hub portion 12 is rotated and pressed against the annular portion 14. In one embodiment, the hub portion 12 may be spun rapidly. The annular portion may or may not include a frictional damping means such as the insert 16. As the hub portion 12 spins and moves into the center of the annular portion 14, as shown in FIG. 2, friction between the hub portion 12 and the annular portion 14 causes a part of the hub portion 12 and the annular portion 14 to melt and create a weld joint. This weld joint may be the friction welded region 18 at the interface of the hub portion 12 and the annular portion 14, as shown in FIG. 1. This process may create a strong bond between the hub portion 12 and the annular portion 14. The resulting rotor assembly may be finished by methods known in the art.

In another embodiment, both the annular portion 14 and the hub portion 12 may be rotated, and the annular portion 14 may be rotated in the opposite direction as the rotation of the hub portion 12. Alternatively, one of the first portion 12 or second portion 14 may be oscillated, for example ultrasonically, to create the friction weld 18.

In another embodiment, interface material may be in contact with the outer perimeter edge 20 of the hub portion 12, or the inner perimeter edge 22 of the annular portion 14, before welding begins. The interface material may include at least one of a silver electroplating, a thin foil of copper, other material that will reduce intermetallics that form during welding, or other material that provides a reinforcement. During the process shown in FIG. 2, the interface material will become welded and incorporate into the friction welding region. The interface material may increase the bond strength of the friction weld, improve corrosion resistance of the friction welded region, or provide an improved noise barrier for lower noise, vibration, and harshness (NVH). The resulting rotor assembly may be finished by methods known in the art.

Figure 3:
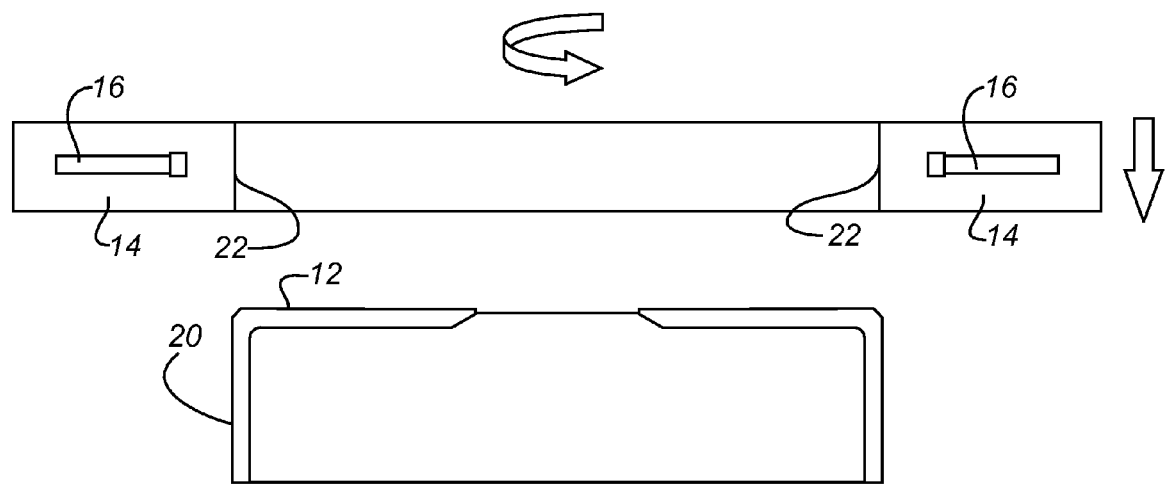
FIG. 3 illustrates a method according to one embodiment of the invention.
Figure 4:
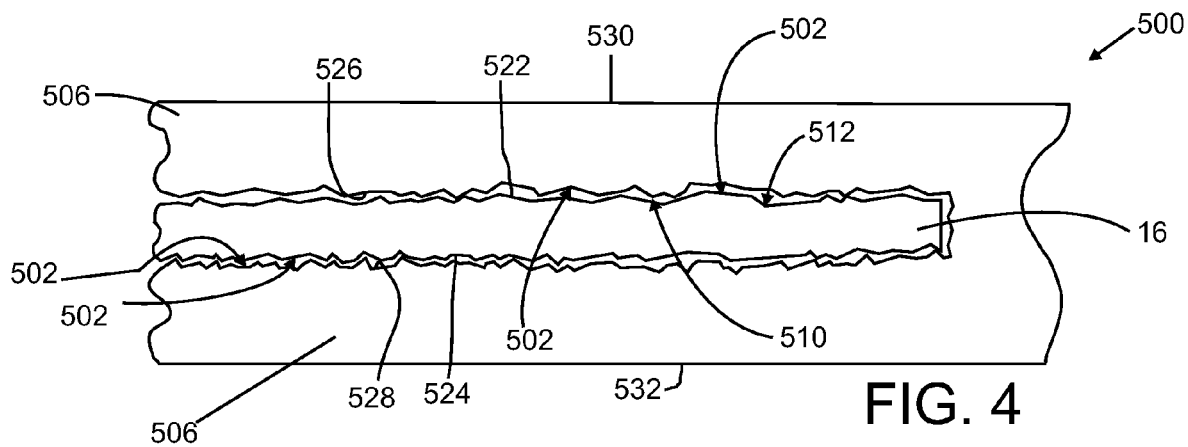
FIG. 4 is a sectional view with portions broken away of one embodiment of the invention including an insert.

Referring now to FIG. 3, a method is provided according to another embodiment of the invention for friction welding. The hub portion 12 is held stationary, while the annular portion 14 is rotated and pressed against the hub portion 12. The annular portion may or may not include the insert 16. As the annular portion 14 spins and moves onto the hub portion 12 such that the hub portion is pressed into the center of the annular portion 14, friction between the hub portion 12 and the annular portion 14 causes a part of the hub portion 12 and the annular portion 14 to melt and create a weld joint. This weld joint may be the friction welded region 18 at the interface of the hub portion 12 and the annular portion 14, as shown in FIG. 1. This process may create a strong bond between the hub portion 12 and the annular portion 14. The resulting rotor assembly may be finished by methods known in the art. In one embodiment, if the insert is exposed at the inner edge of the annular portion, the insert can be sealed from the environment by the friction weld 18. An interface material may be used as described above.

The above-described method of friction welding a hub and annular portion may be used to make a variety of products including, but not limited to, a disc brake rotor, pulley, brake drum, gear, motor housing, or other products including a hub and an annular portion.

Referring to FIGS. 4-19, one embodiment of the invention includes a product or part 500 having a frictional damping means. The frictional damping means may be used in a variety of applications including, but not limited to, applications where it is desirable to reduce noise associated with a vibrating part or reduce the vibration amplitude and/or duration of a part that is struck, dynamically loaded, excited, or set in motion. In one embodiment the frictional damping means may include an interface boundary conducive to frictionally damping a vibrating part. In one embodiment the damping means may include frictional surfaces 502 constructed and arranged to move relative to each other and in frictional contact, so that vibration of the part is dissipated by frictional damping due to the frictional movement of the surfaces 502 against each other.

According to various illustrative embodiments of the invention, frictional damping may be achieved by the movement of the frictional surfaces 502 against each other. The movement of frictional surfaces 502 against each other may include the movement of: surfaces of the body 506 of the part against each other; a surface of the body 506 of the part against a surface of the insert 16; a surface of the body 506 of the part against the layer 520; a surface of the insert 16 against the layer 520; a surface of the body 506 of the part against the particles 514 or fibers; a surface of the insert 16 against the particles 514 or fibers; or by frictional movement of the particles 514 or fibers against each other or against remaining binder material.

In embodiments wherein the frictional surface 502 is provided as a surface of the body 506 or the insert 16 or a layer 520 over one of the same, the frictional surface 502 may have a minimal area over which frictional contact may occur that may extend in a first direction a minimum distance of 0.1 mm and/or may extend in a second (generally traverse) direction a minimum distance of 0.1 mm. In one embodiment the insert 16 may be an annular body and the area of frictional contact on a frictional surface 502 may extend in an annular direction a distance ranging from about 20 mm to about 1000 mm and in a transverse direction ranging from about 10 mm to about 75 mm. The frictional surface 502 may be provided in a variety of embodiments, for example, as illustrated in FIGS. 4-19.

Referring again to FIG. 4, in another embodiment of the invention one or more of the outer surfaces 522, 524 of the insert 16 or surfaces 526, 528 of the body 506 of the part 500 may include a relatively rough surface including a plurality of peaks 510 and valleys 512 to enhance the frictional damping of the part. In one embodiment, the surface of the insert 16 or the body 506 may be abraded by sandblasting, glass bead blasting, water jet blasting, chemical etching, machining or the like.

Figure 5:
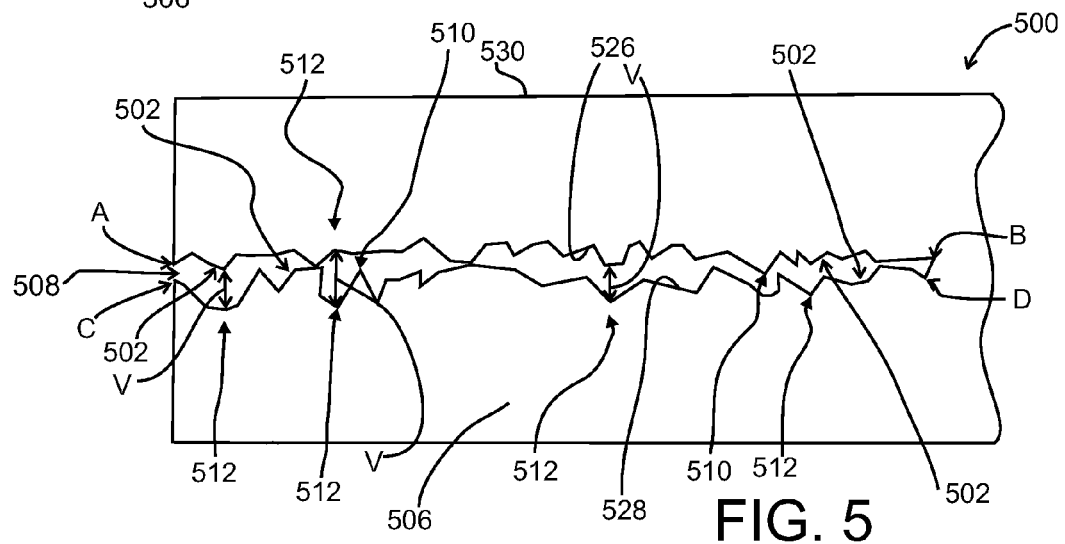
FIG. 5 is a sectional view with portions broken away of one embodiment of the invention including two spaced apart frictional surfaces of a cast metal body portion.

As shown in FIG. 5, in one embodiment one frictional surface 502 (for example extending from points A-B) may be a first surface of the body 506 of the part 500 positioned adjacent to a second frictional surface 502 (for example extending from points C-D) of the body 506. The body 506 may include a relatively narrow slot-like feature 508 formed therein so that at least two of the frictional surfaces 502 defining the slot-like feature 508 may engage each other for frictional movement during vibration of the part to provide frictional damping of the part 500. In various embodiments of the invention, the slot-like feature 508 may be formed by machining the cast part, or by using a sacrificial casting insert that may be removed after the casting by, for example, etching or machining. In one embodiment a sacrificial insert may be used that can withstand the temperature of the molten metal during casting but is more easily machined than the cast metal. Each frictional surface 502 may have a plurality of peaks 510 and a plurality of valleys 512. The depth as indicated by line V of the valleys 512 may vary with embodiments. In various embodiments, the average of the depth V of the valleys 512 may range from about 1 µm-300 µm, 50 µm-260 µm, 100 µm-160 µm or variations of these ranges. However, for all cases there is local contact between the opposing frictional surfaces 502 during component operation for frictional damping to occur.

Figure 8:
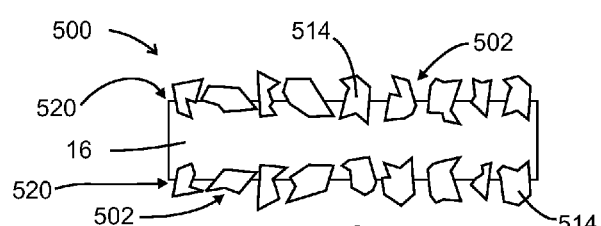
FIG. 8 is an enlarged view of one embodiment of the invention.
Figure 9:
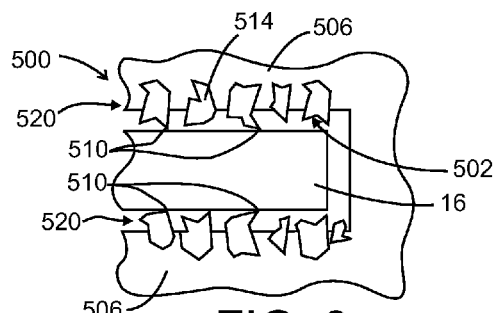
FIG. 9 is a sectional view with portions broken away of one embodiment of the invention.
Figure 10:
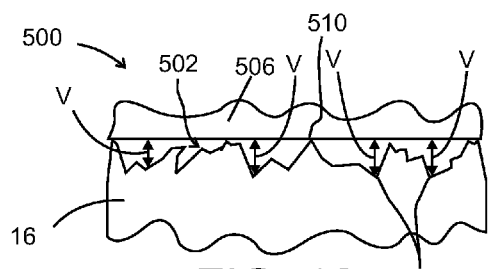
FIG. 10 is an enlarged sectional view with portions broken away of one embodiment of the invention.
Figure 11:
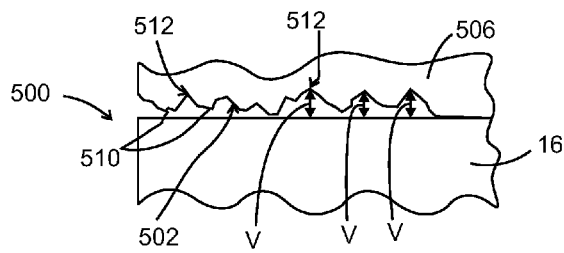
FIG. 11 is an enlarged sectional view with portions broken away of one embodiment of the invention.
Figure 12:
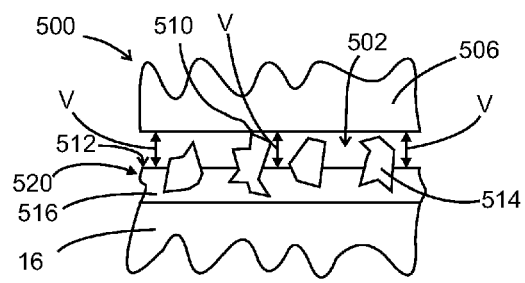
FIG. 12 is an enlarged sectional view with portions broken away of one embodiment of the invention.
Figure 13:
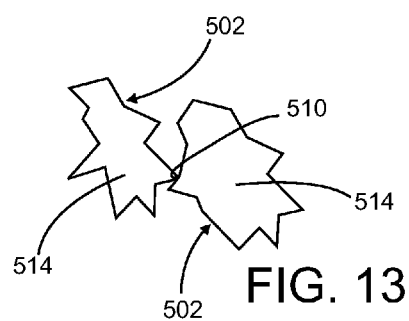
FIG. 13 illustrates one embodiment of the invention.

In another embodiment of the invention the damping means or frictional surface 502 may be provided by particles 514 or fibers provided on at least one face of the insert 16 or a surface of the body 506 of the part 500. The particles 514 may have an irregular shape (e.g., not smooth) to enhance frictional damping, as illustrated in FIG. 13. One embodiment of the invention may include a layer 520 including the particles 514 or fibers which may be bonded to each other or to a surface of the body 506 of the part or a surface of the insert 16 due to the inherent bonding properties of the particles 514 or fibers. For example, the bonding properties of the particles 514 or fibers may be such that the particles 514 or fibers may bind to each other or to the surfaces of the body 506 or the insert 16 under compression. In another embodiment of the invention, the particles 514 or the fibers may be treated to provide a coating thereon or to provide functional groups attached thereto to bind the particles together or attach the particles to at least one of a surface of the body 506 or a surface of the insert 16. In another embodiment of the invention, the particles 514 or fibers may be embedded in at least one of the body 506 of the part or the insert 16 to provide the frictional surface 502 (FIGS. 8-9).

In embodiments wherein at least a potion of the part 500 is manufactured such that the insert 16 and/or the particles 514 or fibers are exposed to the temperature of a molten material such as in casting, the insert 16 and/or particles 514 or fibers may be made from materials capable of resisting flow or resisting significant erosion during the manufacturing. For example, the insert 16 and/or the particles 514 or fibers may include refractory materials capable of resisting flow or that do not significantly erode at temperatures above 1100° F., above 2400° F., or above 2700° F. When molten material, such as metal, is cast around the insert 16 and/or the particles 514, the insert 16 or the particles 514 should not be wet by the molten material so that the molten material does not bond to the insert 16 or layer 520 at locations wherein a frictional surface 502 for providing frictional damping is desired.

Illustrative examples of suitable particles 514 or fibers include, but are not limited to, particles or fibers including silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles. In one embodiment of the invention the particles 514 may have a length along the longest dimension thereof ranging from about 1 µm-350 µm, or 10 µm-250 µm.

Figure 7:
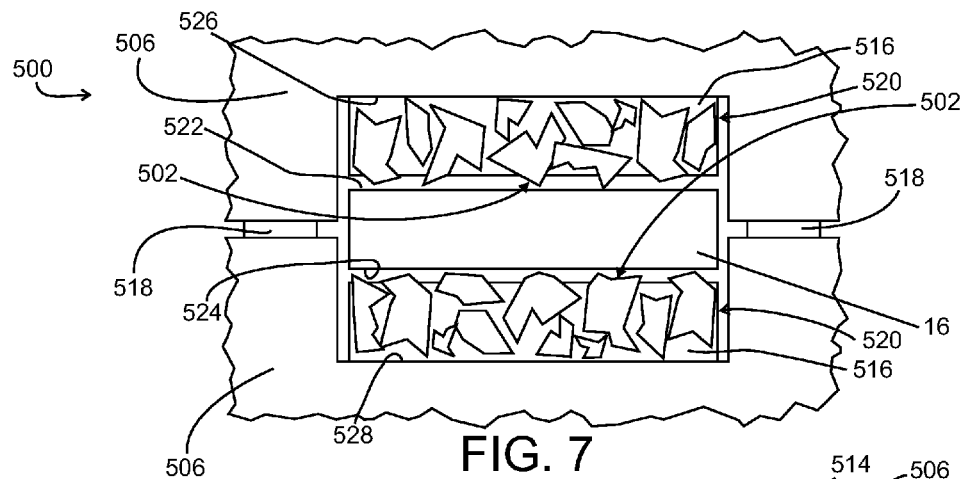
FIG. 7 is a sectional view with portions broken away of one embodiment of the invention.

In embodiments wherein the part 500 is made using a process wherein the insert 16 and/or the particles 514 or fibers are not subjected to relatively high temperatures associated with molten materials, the insert 16 and/or particles 514 or fibers may be made from a variety of other materials including, but not limited to, non-refractory polymeric materials, ceramics, composites, wood or other materials suitable for frictional damping. For example, such non-refractory materials may also be used (in additional to or as a substitute for refractory materials) when two portions of the body 506 of the part 500 are held together mechanically by a locking mechanism, or by fasteners, or by adhesives, or by welding 518, as illustrated in FIG. 7.

In another embodiment of the invention, the layer 520 may be a coating over the body 506 of the part or the insert 16. The coating may include a plurality of particles 514 which may be bonded to each other and/or to the surface of the body 506 of the part or the insert 16 by an inorganic or organic binder 516 (FIGS. 6-7, 12) or other bonding materials. Illustrative examples of suitable binders include, but are not limited to, epoxy resins, phosphoric acid binding agents, calcium aluminates, sodium silicates, wood flour, or clays. In another embodiment of the invention the particles 514 may be held together and/or adhered to the body 506 or the insert 16 by an inorganic binder. In one embodiment, the coating may be deposited on the insert 16 or body 506 as a liquid dispersed mixture of alumina-silicate-based, organically bonded refractory mix.

In another embodiment, the coating may include at least one of alumina or silica particles, mixed with a lignosulfonate binder, cristobalite ($SiO_2$), quartz, or calcium lignosulfonate. The calcium lignosulfonate may serve as a binder. In one embodiment, the coating may include IronKote. In one embodiment, a liquid coating may be deposited on a portion of the insert and may include any high temperature ceramic coating, such as but not limited to, Ladle Kote 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers.

When the layer 520 including particles 514 or fibers is provided over the insert 16 or the body 506 of the part the thickness L (FIG. 6) of the layer 520, particles 514 and/or fibers may vary. In various embodiments, the thickness L of the layer 520, particles 514 and/or fibers may range from about 1 µm-400 µm, 10 µm-400 µm, 30 µm-300 µm, 30 µm-40 µm, 40 µm-100 µm, 100 µm-120 µm, 120 µm-200 µm, 200 µm-300 µm, 200 µm-250 µm, or variations of these ranges.

In yet another embodiment of the invention the particles 514 or fibers may be temporarily held together and/or to the surface of the insert 16 by a fully or partially sacrificial coating. The sacrificial coating may be consumed by molten metal or burnt off when metal is cast around or over the insert 16. The particles 514 or fibers are left behind trapped between the body 506 of the cast part and the insert 16 to provide a layer 520 consisting of the particles 514 or fibers or consisting essentially of the particles 514 or fibers.

Figure 6:
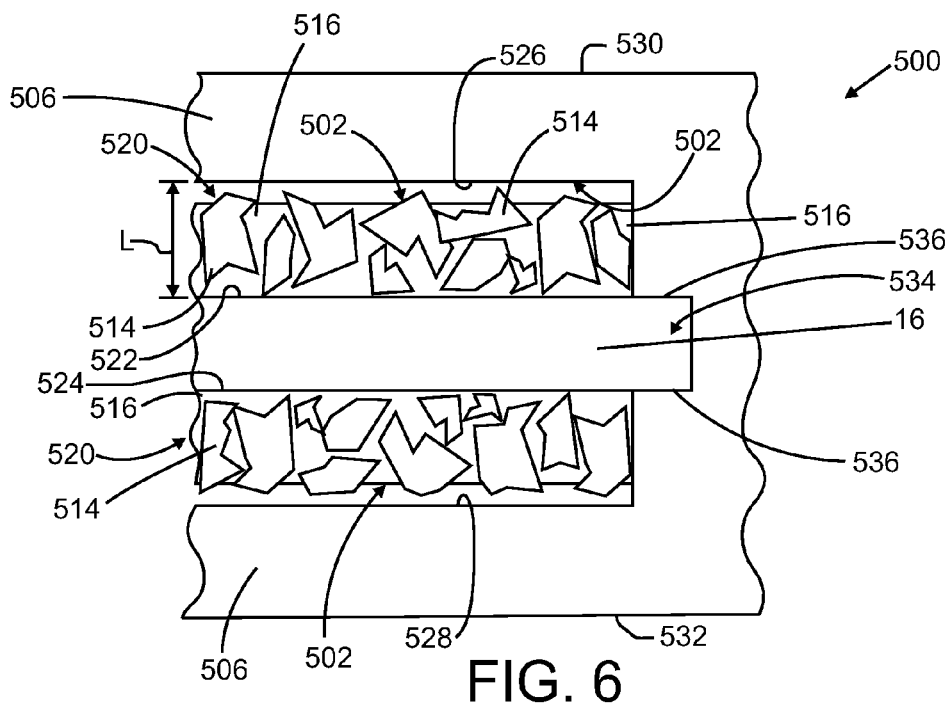
FIG. 6 is a sectional view with portions broken away of one embodiment of the invention including an insert having a layer thereon to provide a frictional surface or damping.

The layer 520 may be provided over the entire insert 16 or only over a portion thereof. In one embodiment of the invention the insert 16 may include a tab 534 (FIG. 6). For example, the insert 16 may include an annular body portion and a tab 534 extending radially inward or outward therefrom. In one embodiment of the invention at least one wettable surface 536 of the tab 534 does not include a layer 520 including particles 514 or fibers, or a wettable material such as graphite is provided over the tab 534, so that the cast metal is bonded to the wettable surface 536 to attach the insert 16 to the body 506 of the part 500 but still allow for frictional damping over the remaining insert surface which is not bonded to the casting.

In one embodiment of the invention at least a portion of the insert 16 is treated or the properties of the insert 16 are such that molten metal will not wet or bond to that portion of the insert 16 upon solidification of the molten metal. According to one embodiment of the invention at least one of the body 506 of the part or the insert 16 includes a metal, for example, but not limited to, aluminum, titanium, steel, stainless steel, cast iron, any of a variety of other alloys, or metal matrix composite including abrasive particles.

In one embodiment of the invention the insert 16 may include a material such as a metal having a higher melting point than the melting point of the molten material being cast around a portion thereof.

In one embodiment the insert 16 may have a minimum average thickness of 0.2 mm and/or a minimum width of 0.1 mm and/or a minimum length of 0.1 mm. In another embodiment the insert 16 may have a minimum average thickness of 0.2 mm and/or a minimum width of 2 mm and/or a minimum length of 5 mm. In other embodiments the insert 16 may have a thickness ranging from about 0.1-20 mm, 0.1-6.0 mm, or 1.0-2.5 mm, or ranges therebetween.

Referring now to FIGS. 10-11, again the frictional surface 502 may have a plurality of peaks 510 and a plurality of valleys 512. The depth as indicated by line V of the valleys 512 may vary with embodiments. In various embodiments, the average of the depth V of the valleys 512 may range from about 1 μm-300 μm, 50 μm-260 μm, 100 μm-160 μm or variations of these ranges. However, for all cases there is local contact between the body 506 and the insert 16 during component operation for frictional damping to occur.

In other embodiments of the invention improvements in the frictional damping may be achieved by adjusting the thickness (L, as shown in FIG. 6) of the layer 520, or by adjusting the relative position of opposed frictional surfaces 502 or the average depth of the valleys 512 (for example, as illustrated in FIG. 5).

In one embodiment the insert 16 is not pre-loaded or under pre-tension or held in place by tension. In one embodiment the insert 16 is not a spring. Another embodiment of the invention includes a process of casting a material comprising a metal around an insert 16 with the proviso that the frictional surface 502 portion of the insert used to provide frictional damping is not captured and enclosed by a sand core that is placed in the casting mold. In various embodiments the insert 16 or the layer 520 includes at least one frictional surface 502 or two opposite friction surfaces 502 that are completely enclosed by the body 506 of the part. In another embodiment the layer 520 including the particles 514 or fibers that may be completely enclosed by the body 506 of the part or completely enclosed by the body 506 and the insert 16, and wherein at least one of the body 506 or the insert 16 comprises a metal or consists essentially of a metal. In one embodiment of the invention the layer 520 and/or insert 16 does not include or is not carbon paper or cloth.

Referring again to FIGS. 4-7, in various embodiments of the invention the insert 16 may include a first face 522 and an opposite second face 524 and the body 506 of the part may include a first inner face 526 adjacent the first face 522 of the insert 16 constructed to be complementary thereto, for example nominally parallel thereto. The body 506 of the part includes a second inner face 528 adjacent the second face 524 of the insert 16 constructed to be complementary thereto, for example parallel thereto. The body 506 may include a first outer face 530 overlying the first face 522 of the insert 16 constructed to be complementary thereto, for example parallel thereto. The body 506 may include a first outer face 532 overlying the second face 524 of the insert 16 constructed to be complementary thereto, for example parallel thereto. However, in other embodiments of the invention the outer faces 530, 532 of the body 506 are not complementary to associated faces 522, 524 of the insert 16. When the damping means is provided by a narrow slot-like feature 508 formed in the body 506 of the part 500, the slot-like feature 508 may be defined in part by a first inner face 526 and a second inner face 528 which may be constructed to be complementary to each other, for example parallel to each other. In other embodiments the surfaces 526 and 528; 526 and 522; or 528 and 524 are mating surfaces but not parallel to each other.

Figure 14:
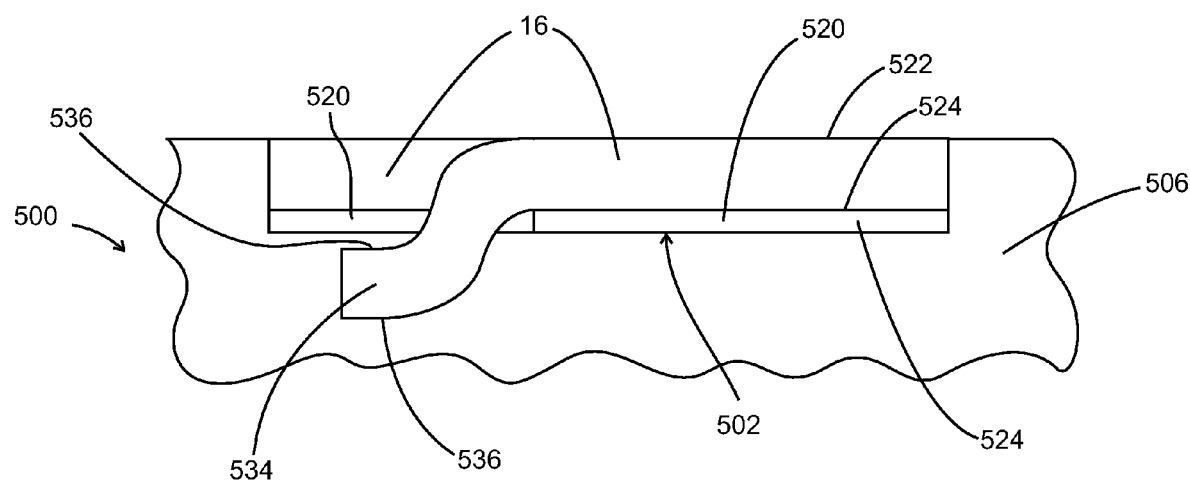
FIG. 14 is a sectional view with portions broken away of one embodiment of the invention.
Figure 15:
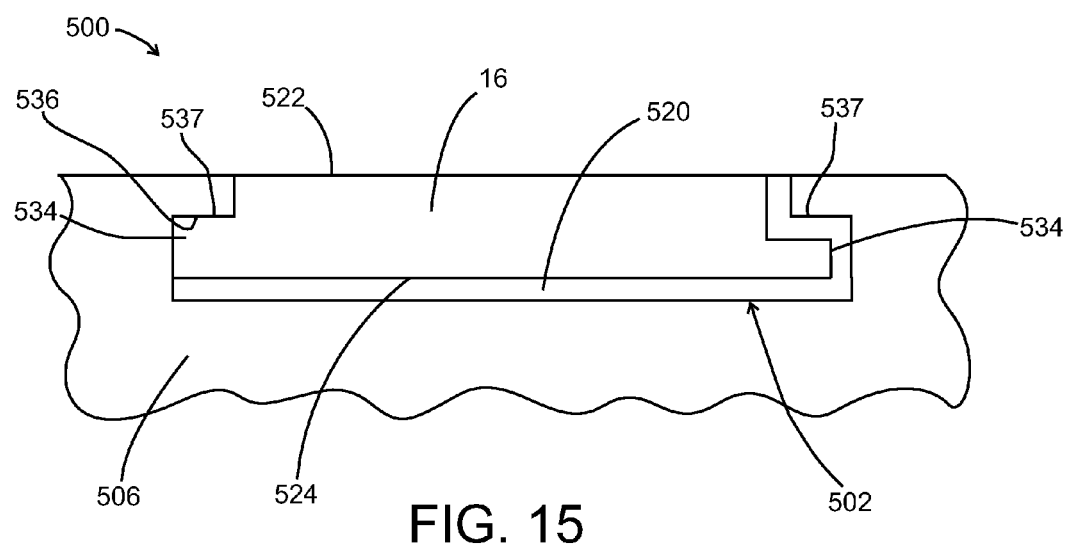
FIG. 15 is a sectional view with portions broken away of one embodiment of the invention.

Referring to FIGS. 14-15, in one embodiment of the invention the insert 16 may be an inlay wherein a first face 522 thereof is not enclosed by the body 506 of the part. The insert 16 may include a tang or tab 534 which may be bent downward as shown in FIG. 14. In one embodiment of the invention a wettable surface 536 may be provided that does not include a layer 520 including particles 514 or fibers, or a wettable material such as graphite is provided over the tab 534, so that the cast metal is bonded to the wettable surface 536 to attach the insert 16 to the body of the part but still allow for frictional damping on the non-bonded surfaces. A layer 520 including particles 514 or fibers may underlie the portion of the second face 524 of the insert 16 not used to make the bent tab 534.

In another embodiment the insert 16 includes a tab 534 which may be formed by machining a portion of the first face 522 of the insert 16 (FIG. 15). The tab 534 may include a wettable surface 536 having cast metal bonded thereto to attach the insert 16 to the body of the part but still allow for friction damping by way of the non-bonded surfaces. A layer 520 including particles 514 or fibers may underlie the entire second face 524 or a portion thereof. In other embodiments of the invention all surfaces including the tabs 534 may be non-wettable, for example by way of a coating 520 thereon, and features of the body portion 506 such as, but not limited to, a shoulder 537 may be used to hold the insert 16 in place.

Figure 16:
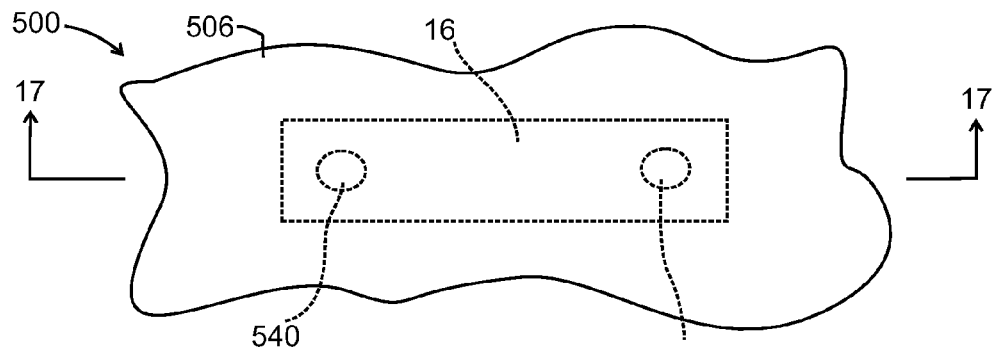
FIG. 16 is a plan view with portions broken away illustrating one embodiment of the invention.

Referring now to FIG. 16, one embodiment of the invention may include a part 500 having a body portion 506 and an insert 16 enclosed by the body part 506. The insert 16 may include through holes formed therein so that a stake or post 540 extends into or through the insert 16.

Figure 17:
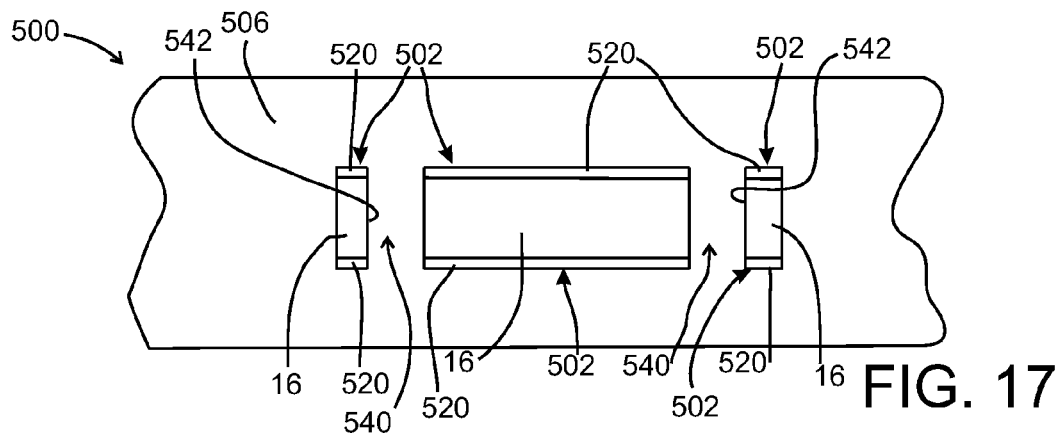
FIG. 17 is a sectional view taken along line 17-17 of FIG. 16 illustrating one embodiment of the invention.

Referring to FIG. 17, which is a sectional view of FIG. 16 taken along line 17-17, in one embodiment of the invention a layer 520 including a plurality of particles 514 or fibers (not shown) may be provided over at least a portion of the insert 16 to provide a frictional surface 502 and to prevent bonding thereto by cast metal. The insert 16 including the layer 520 may be placed in a casting mold and molten metal may be poured into the casting mold and solidified to form the post 540 extending through the insert 16. An inner surface 542 defining the through hole of the insert 16 may be free of the layer 520 or may include a wettable material thereon so that the post 540 is bonded to the insert 16. Alternatively, in another embodiment the post 16 may not be bonded the insert 16 at the inner surface 542. The insert 16 may include a feature such as, but not limited to, a shoulder 505 and/or the post 540 may include a feature such as, but not limited to, a shoulder 537 to hold the insert in place.

Figure 18:
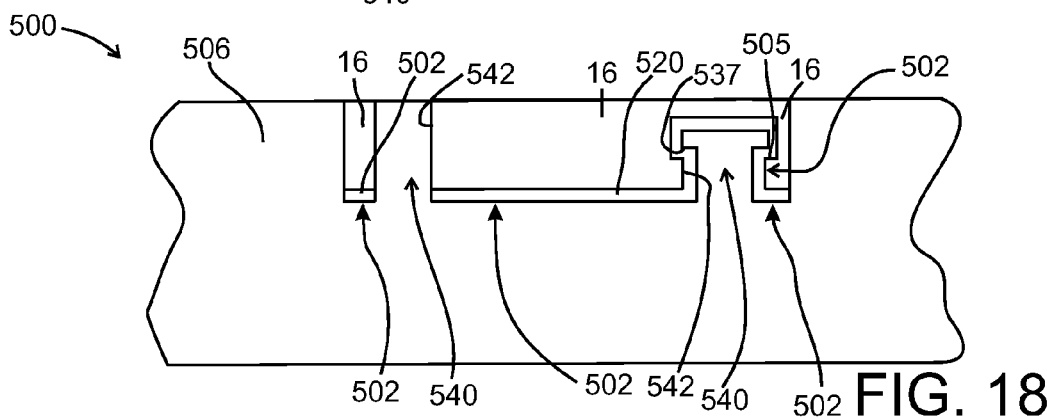
FIG. 18 is a sectional view with portions broken away illustrating one embodiment of the invention.

Referring now to FIG. 18, in another embodiment, the insert may be provided as an inlay in a casting including a body portion 506 and may include a post 540 extending into or through the insert 16. The insert 16 may be bonded to the post 540 to hold the insert in place and still allow for frictional damping. In one embodiment of the invention the insert 16 may include a recess defined by an inner surface 542 of the insert 16 and a post 540 may extend into the insert 16 but not extend through the insert 16. In one embodiment the post 16 may not be bonded to the insert 16 at the inner surface 542. The insert 16 may include a feature such as, but not limited to, a shoulder 505 and/or the post 540 may include a feature such as, but not limited to, a shoulder 537 to hold the insert in place.

Figure 19:
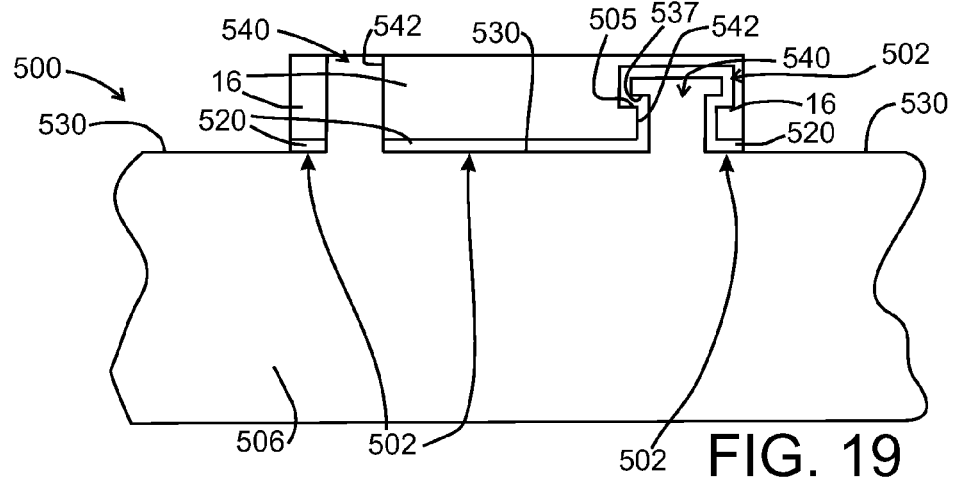
FIG. 19 is a sectional view with portions broken away illustrating another embodiment of the invention.

Referring now to FIG. 19, in another embodiment of the invention, an insert 16 or substrate may be provided over an outer surface 530 of the body portion 506. A layer 520 may or may not be provided between the insert 16 and the outer surface 530. The insert 16 may be constructed and arranged with through holes formed therethrough or a recess therein so that cast metal may extend into or through the insert 16 to form a post 540 to hold the insert in position and still allow for frictional damping. The post 540 may or may not be bonded to the insert 16 as desired. The post 540 may extend through the insert 16 and join another portion of the body 506 if desired.

The above description of embodiments of the invention is merely exemplary in nature and, thus, variations thereof are not to be regarded as a departure from the spirit and scope of the invention.

What is claimed is:

1. A method comprising:
   providing a first portion comprising one of an annular brake rotor cheek having an inner perimeter edge or a brake rotor hub portion having a downward extending outer perimeter edge;
   rotating a second portion comprising the other of the hub portion or the rotor cheek; and
   pressing the second portion against the first portion such that friction between the hub portion and the rotor cheek causes a weld joint at the inner perimeter edge and the outer perimeter edge to be created to secure the hub portion to the rotor cheek to produce a brake rotor.

2. A method as set forth in claim 1 wherein the brake rotor cheek comprises a first material, the hub portion comprises a second material, and the second material is lighter by volume than the first material.

3. A method as set forth in claim 1 wherein the first portion is the brake rotor cheek and the second portion is the hub portion.

4. A method as set forth in claim 1 wherein the first portion is the hub portion and the second portion is the brake rotor cheek.

5. A method as set forth in claim 2 wherein the first material comprises at least one of cast iron, gray cast iron, or steel.

6. A method as set forth in claim 2 wherein the second material comprises at least one of aluminum, aluminum metal matrix composites, titanium, magnesium, plastic, or composite material.

7. A method as set forth in claim 1 wherein the rotor cheek comprises a flat annular insert.

8. A method as set forth in claim 7 wherein the rotor cheek further comprises a coating over at least a portion of the insert to provide friction damping.

9. A method as set forth in claim 1 further comprising providing an interface layer on a part of one of the first portion or the second portion.

10. A method as set forth in claim 9 wherein the interface layer comprises at least one of a silver electroplating, a thin foil of copper, other material that will reduce intermetallics that form during welding, or other material that provides a reinforcement.

11. A method as set forth in claim 1 further comprising rotating the first portion in the opposite direction as the rotation of the second portion.

12. A method comprising:
   positioning a first portion of a brake rotor assembly comprising one of an annular brake rotor cheek or a brake rotor hub portion against a second portion of the brake rotor assembly comprising the other of the hub portion or the annular rotor cheek; and
   oscillating the second portion such that friction between the hub portion and the annular rotor cheek causing a weld joint to be formed to secure the hub portion to the rotor cheek to produce a brake rotor and wherein brake rotor hub portion is disposed in the center of annular rotor cheek.

13. A method as set forth in claim 12 wherein the rotor cheek comprises a first material, the hub portion comprises a second material, and the second material is lighter by volume than the first material.

14. A method as set forth in claim 12 wherein the first portion is the rotor cheek and the second portion is the hub portion.

15. A method as set forth in claim 12 wherein the first portion is the hub portion and the second portion is the rotor cheek.

16. A product comprising:
   a brake rotor comprising an annular brake rotor cheek and a hub portion disposed in the center of the annular rotor cheek; and
   a friction welded region at an interface of the rotor cheek and the hub portion so that the rotor cheek is welded to the hub portion at the interface and the rotor cheek encompasses the hub portion.

17. A product as set forth in claim 16 wherein the friction welded region comprises an interface material that increases the bond strength of the friction welded region.

18. A product as set forth in claim 17 wherein the interface material comprises at least one of a silver electroplating, a thin foil of copper, other material that will reduce intermetallics that form during welding, or other material that provides a reinforcement.

19. A product as set forth in claim 16 wherein the rotor cheek comprises an insert.

20. A product as set forth in claim 19 wherein there is a coating over at least a portion of the insert to provide frictional damping of the product.

21. A method comprising:
   providing a first portion comprising a brake rotor cheek or a hub portion, and further comprising an insert received in the brake rotor cheek and constructed and arranged to provide frictional damping of the brake rotor cheek;
   rotating the second portion comprising the other of the hub portion or the rotor cheek; and
   pressing the second portion against the first portion such that friction between the hub portion and the rotor cheek causes a weld joint to be created, securing the brake rotor cheek to the hub portion and sealing the insert from the environment.

22. A method as set forth in claim 21 further comprising a coating over at least a portion of the insert.

23. A product comprising:
   a brake rotor comprising a brake rotor cheek, an insert received in the brake rotor cheek and a hub portion disposed in the center of the brake rotor cheek; and a friction weld region at an interface of the rotor cheek and the hub portion and constructed and arranged to seal the insert from the environment.

24. A product as set forth in claim 23 further comprising a coating over at least a portion of the insert.

* * * * *